(12) United States Patent
Abe

(10) Patent No.: US 6,892,299 B2
(45) Date of Patent: May 10, 2005

(54) INFORMATION PROCESSOR, INFORMATION PROCESSING METHOD, INFORMATION PROCESSING SYSTEM, CONTROL PROGRAM, AND STORAGE MEDIUM

(75) Inventor: Koichi Abe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/331,324

(22) Filed: Dec. 31, 2002

(65) Prior Publication Data

US 2003/0135668 A1 Jul. 17, 2003

(30) Foreign Application Priority Data

Jan. 16, 2002 (JP) .......................... 2002-007514
Feb. 6, 2002 (JP) .......................... 2002-029763
Dec. 20, 2002 (JP) .......................... 2002-370140

(51) Int. Cl.$^7$ ............................... G06F 3/00
(52) U.S. Cl. ............... 713/2; 710/8; 710/10; 710/15; 710/62; 710/104; 709/200; 717/176; 717/178
(58) Field of Search ............... 710/8, 10, 15, 710/62, 104; 709/200; 717/176, 178; 713/2

(56) References Cited

U.S. PATENT DOCUMENTS

| 6,210,051 B1 | * | 4/2001 | Sakurai | ............... 400/62 |
| 6,301,012 B1 | * | 10/2001 | White et al. | ............... 358/1.15 |
| 6,523,073 B1 | * | 2/2003 | Kammer et al. | ............... 710/48 |
| 6,606,669 B1 | * | 8/2003 | Nakagiri | ............... 719/327 |
| 6,611,887 B1 | * | 8/2003 | Sedlack | ............... 710/62 |
| 6,668,376 B1 | * | 12/2003 | Wang et al. | ............... 717/178 |
| 6,671,749 B1 | * | 12/2003 | Williams et al. | ............... 710/10 |
| 6,731,858 B1 | * | 5/2004 | Sato | ............... 386/46 |
| 6,754,723 B1 | * | 6/2004 | Kato | ............... 710/8 |
| 2002/0080401 A1 | | 6/2002 | Abe | ............... 358/1.15 |

FOREIGN PATENT DOCUMENTS

| EP | 0 716 371 | 6/1996 |
| JP | 8-161250 | 6/1996 |

* cited by examiner

Primary Examiner—A. Elamin
(74) Attorney, Agent, or Firm—Fitzpatrick, Cella, Harper & Scinto

(57) ABSTRACT

To allow an appropriate printer driver to be downloaded taking into consideration identification information for a printer, control information used to control a peripheral device is determined based on identification information for a terminal device and identification information for the peripheral device and the determined control information for controlling the peripheral device is transmitted to the terminal device.

20 Claims, 19 Drawing Sheets

←→ INDICATES ADDRESS DATA BUS

MFG:Canon;CMD:BJL;MDL:Model-A;CLS:PRINTER;DES:Canon Model-A;VER:4.00;

FIG. 11

```
 1: <?xml version="1.0" ?>
 2: <root xmlns="urn:schemas-Abe-Lab:device-1-0">
 3:   <device>
 4:     <host>
 5:       <type>Host Type</type>
 6:       <manufacturer>Manufacturer Name</manufacturer>
 7:       <model>Model Name</model>
 8:       <cpu>CPU Type</cpu>
 9:       <os>OS Name</os>
10:       <version>Firmware Version</version>
11:       <deviceId>Device ID</deviceId>
12:     </host>
13:     <peripheralDevice>
14:       <type>Peripheral Device Type</type>
15:       <manufacturer>Manufacturer Name</manufacturer>
16:       <model>Model Name</model>
17:       <version>Firmware Version</version>
18:       <driverVersion>Driver Version</driverVersion>
19:       <driver>Driver Module</driver>
20:       <deviceId>Device ID</deviceId>
21:       <availableHost>Available Host Type</availableHost>
22:     </peripheralDevice>
23:   </device>
24: </root>
```

FIG. 12

```
 1: <?xml version="1.0" ?>
 2: <root xmlns="urn:schemas-Abe-Lab:device-1-0">
 3:   <device>
 4:     <host>
 5:       <type>phone</type>
 6:       <manufacturer>Abe-Lab</manufacturer>
 7:       <model>SP104</model>
 8:       <cpu>ARM</cpu>
 9:       <os>Windows CE 3.0</os>
10:       <version>5.00</version>
11:       <deviceId>
12:         MFG:Abe-Lab;MDL:SP104;CLS:PHONE;DES:Abe-Lab SP104;VER:5.00;CPU:ARM;OS:Windows CE 3.0;
13:       </deviceId>
14:     </host>
15:     <peripheralDevice>
16:       <type>printer</type>
17:       <manufacturer>Canon</manufacturer>
18:       <model>Model-A</model>
19:       <version>4.00</version>
20:       <driverVersion>1.00</driverVersion>
21:       <driver></driver>
22:       <deviceId>
23:         MFG:Canon;CMD:BJL;MDL:Model-A;CLS:PRINTER;DES:Canon Model-A;VER:4.00;
24:       </deviceId>
25:       <availableHost>phone</availableHost>
26:     </peripheralDevice>
27:   </device>
28: </root>
```

FIG. 13

```xml
 1: <?xml version="1.0" ?>
 2: <root xmlns="urn:schemas-Abe-Lab:server-1-0">
 3:   <server>
 4:     <driver>
 5:       <peripheralDevice>
 6:         <type>printer</type>
 7:         <manufacturer>Canon</manufacturer>
 8:         <model>Model-A</model>
 9:         <os>
10:           <name>Windows CE 3.0</name>
11:           <host>
12:             <type>phone</type>
13:             <cpu>
14:               <type>ARM</type>
15:               <driverVersion>2.00</driverVersion>
16:               <driver>http://Abe-Lab.jp/download/Canon/Model-A/CE30/phone/v200drv_ARM.exe</driver>
17:             </cpu>
18:             <cpu>
19:               <type>MIPS</type>
20:               <driverVersion>2.00</driverVersion>
21:               <driver>http://Abe-Lab.jp/download/Canon/Model-A/CE30/phone/v200drv_MIPS.exe</driver>
22:             </cpu>
23:             <cpu>
24:               <type>SH-4</type>
25:               <driverVersion>2.00</driverVersion>
26:               <driver>http://Abe-Lab.jp/download/Canon/Model-A/CE30/phone/v200drv_SH-4.exe</driver>
27:             </cpu>
28:           </host>
```

FIG. 14

```
29:    <host>
30:      <type>Pocket PC</type>
31:      <cpu>
32:        <type>ARM</type>
33:        <driverVersion>2.50</driverVersion>
34:        <driver>http://Abe-Lab.jp/download/Canon/Model-A/CE30/PPC/v250drv_ARM.exe</driver>
35:      </cpu>
36:      <cpu>
37:        <type>MIPS</type>
38:        <driverVersion>2.50</driverVersion>
39:        <driver>http://Abe-Lab.jp/download/Canon/Model-A/CE30/PPC/v250drv_MIPS.exe</driver>
40:      </cpu>
41:    </host>
42:  </os>
```

FIG. 15

```
43:  <os>
44:    <name>Windows NT 4.0</name>
45:    <host>
46:      <type>pc</type>
47:      <cpu>
48:        <type>X86</type>
49:        <driverVersion>1.50</driverVersion>
50:        <driver>http://Abe-Lab.jp/download/Canon/Model-A/NT40/pc/v150drv_X86.exe</driver>
51:      </cpu>
52:      <cpu>
53:        <type>Alpha</type>
54:        <driverVersion>1.50</driverVersion>
55:        <driver>http://Abe-Lab.jp/download/Canon/Model-A/NT40/pc/v150drv_Alpha.exe</driver>
56:      </cpu>
57:      <cpu>
58:        <type>PC-9800</type>
59:        <driverVersion>1.50</driverVersion>
60:        <driver>http://Abe-Lab.jp/download/Canon/Model-A/NT40/pc/v150drv_PC-9800.exe</driver>
61:      </cpu>
62:    </host>
63:  </os>
64: </peripheralDevice>
```

FIG. 16

```
65: <peripheralDevice>
66:   <type>printer</type>
67:   <manufacturer>Canon</manufacturer>
68:   <model>Model-B</model>
69:   <os>
70:     <name>Windows CE 3.0</name>
71:     <host>
72:       <type>phone</type>
73:       <cpu>
74:         <type>ARM</type>
75:         <driverVersion>2.00</driverVersion>
76:         <driver>http://Abe-Lab.jp/download/Canon/Model-B/CE30/phone/v200drv_ARM.exe</driver>
77:       </cpu>
78:       <cpu>
79:         <type>MIPS</type>
80:         <driverVersion>1.00</driverVersion>
81:         <driver>http://Abe-Lab.jp/download/Canon/Model-B/CE30/phone/v100drv_MIPS.exe</driver>
82:       </cpu>
83:     </host>
84:     <host>
85:       <type>Pocket PC</type>
86:       <cpu>
87:         <type>ARM</type>
88:         <driverVersion>2.50</driverVersion>
89:         <driver>http://Abe-Lab.jp/download/Canon/Model-B/CE30/PPC/v250drv_ARM.exe</driver>
90:       </cpu>
91:     </host>
92:   </os>
```

FIG. 17

```
 93:      <os>
 94:        <name>Windows NT 4.0</name>
 95:        <host>
 96:          <type>pc</type>
 97:          <cpu>
 98:            <type>X86</type>
 99:            <driverVersion>1.20</driverVersion>
100:            <driver>http://Abe-Lab.jp/download/Canon/Model-B/NT40/pc/v120drv_X86.exe</driver>
101:          </cpu>
102:        </host>
103:      </os>
104:    </peripheralDevice>
105:  </driver>
106: </server>
107:</root>
```

FIG. 20

```xml
1:  <?xml version="1.0" ?>
2:  <root xmlns="urn:schemas-Abe-Lab:device-1-0">
3:    <device>
4:      <host>
5:        <type>phone</type>
6:        <manufacturer>Abe-Lab</manufacturer>
7:        <model>SP104</model>
8:        <cpu>ARM</cpu>
9:        <os>Windows CE 3.0</os>
10:       <version>5.00</version>
11:       <deviceId></deviceId>
12:     </host>
13:     <peripheralDevice>
14:       <type>printer</type>
15:       <manufacturer>Canon</manufacturer>
16:       <model>Model-A</model>
17:       <version>4.00</version>
18:       <driverVersion>2.00</driverVersion>
19:       <driver>http://Abe-Lab.jp/download/Canon/Model-A/CE30/phone/v200drv_ARM.exe</driver>
20:       <deviceId></deviceId>
21:       <availableHost>phone</availableHost>
22:     </peripheralDevice>
23:   </device>
24: </root>
```

INFORMATION PROCESSOR, INFORMATION PROCESSING METHOD, INFORMATION PROCESSING SYSTEM, CONTROL PROGRAM, AND STORAGE MEDIUM

BACKGROUND OF THE INVENTION

1. Field of the Invention

The present invention relates to an information processor, information processing method, information processing system, control program, and storage medium.

2. Related Background Art

Conventionally, a host computer is connected with a printer via a bidirectional interface and a data ROM or external storage on the printer contains a plurality of printer drivers corresponding to different host computer OSes. If a printer driver is not provided on the host computer, a printer driver compatible with the host computer OS is transferred from the printer to the host computer and installed on the host computer OS. See, for example, Japanese Patent Application Laid-Open No. 8-161250 (EP A2 71637).

However, the above method does not allow any appropriate printer driver to be downloaded taking into consideration identification information for the printer. Also, it does not take into account the same OS may run in different hardware environments, and thus makes it impossible to download an appropriate printer driver by recognizing the hardware configuration of the host.

SUMMARY OF THE INVENTION

The present invention has been achieved to solve the prior art problems described above.

It is an object of the invention to provide an information processor, information processing method, information processing system, program, and storage medium which allow an appropriate printer driver to be downloaded taking into consideration identification information for a printer.

It is a further object of the invention to provide an information processor, information processing method, information processing system, program, and storage medium which allow an appropriate printer driver to be downloaded by recognizing the hardware configuration of a terminal device.

To attain the above objects, an information processor according to the present invention includes:

input means for inputting identification information for a terminal device and identification information for a peripheral device;

determination means for determining control information used to control the peripheral device based on the identification information for the terminal device and identification information for the peripheral device inputted via the above described input means; and transmission means for transmitting the control information used to control the peripheral device and determined by the above described determination means to the terminal device.

Also, an information processing system according to the present invention includes:

a terminal device which acquires identification information for a recording device before recording;

a server which determines control information used to control the recording device based on the identification information for the terminal device and identification information for the recording device transmitted from the terminal device and transmits the determined control information for controlling the recording device to the terminal device;

the recording device which receives and records information generated based on the control information transmitted from the server to the terminal device.

BRIEF DESCRIPTION OF THE DRAWINGS

FIG. 11 is a diagram showing a data format of data transferred between portable terminal and printer;

FIG. 12 is a diagram showing data sent from the portable terminal 104 to a center server 110 in Step 804 of FIG. 8;

FIG. 13 is a diagram showing a database of printer drivers registered with the center server 110;

FIG. 14 is a diagram showing the database of printer drivers registered with the center server 110;

FIG. 15 is a diagram showing the database of printer drivers registered with the center server 110;

FIG. 16 is a diagram showing the database of printer drivers registered with the center server 110;

FIG. 17 is a diagram showing the database of printer drivers registered with the center server 110;

FIG. 20 is a diagram showing data transmitted from the center server 110 to the portable terminal 104.

DESCRIPTION OF THE PREFERRED EMBODIMENTS

First Embodiment of the Invention

An embodiment of the present invention will be described below with reference to the drawings.

In the following description, "USB stands for Universal Serial Bus", which is a known interface capable of two-way communications, and description thereof will be omitted.

Figure 1:
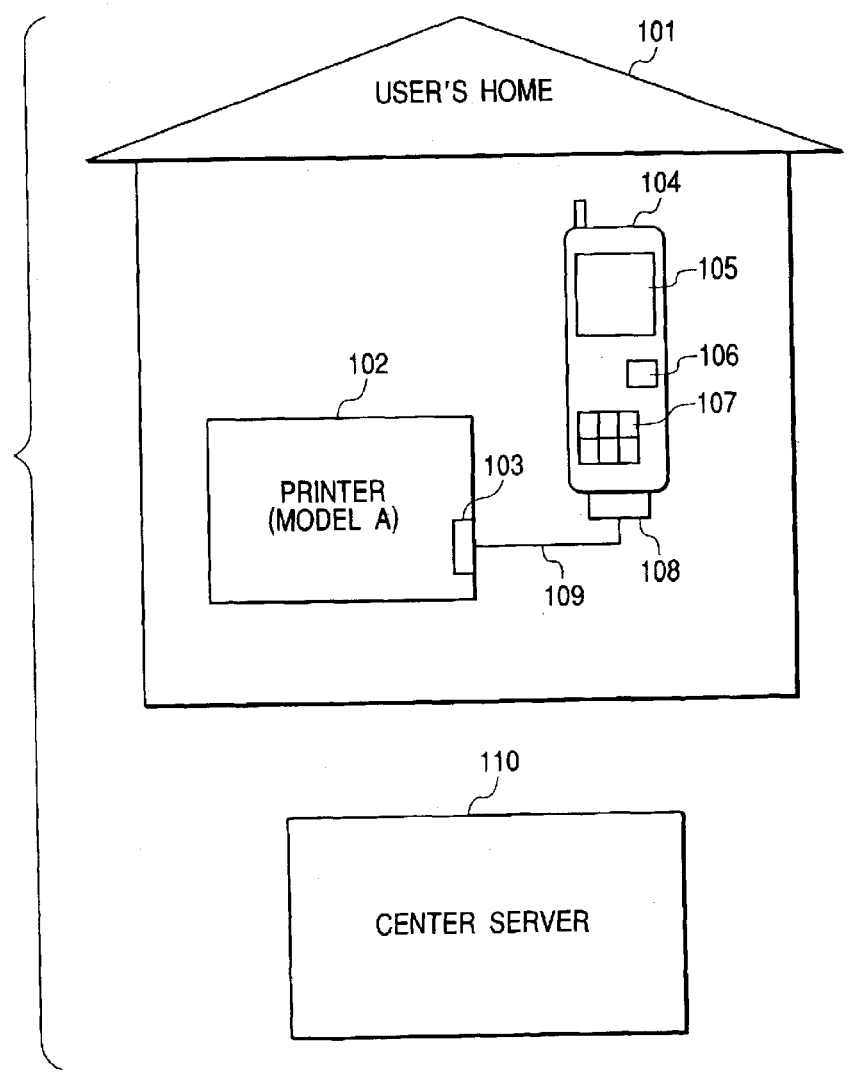
FIG. 1 is a diagram showing a configuration of a printing system which is a recording system according to an embodiment of the present invention.

FIG. 1 is a diagram showing a configuration of a printing system which is a recording system according to this embodiment. In the drawing, reference numeral 101 denotes a house (user's home) where a printer 102 (Model A) which is a recording device has been installed. Reference numeral 103 denotes a USB interface port (slave) used to communicate print data or the like. Reference numeral 104 denotes a portable telephone (hereinafter referred to as a portable terminal) which is a portable terminal device equipped with wireless communications capabilities and is capable of data communications as well as transmission and reception of e-mail and access to various home pages and content via the Internet in addition to typical phone functions (transmission and reception of vice data)

Reference numeral 105 denotes a display which consists of a liquid crystal display or the like and is capable of displaying telephone numbers, e-mail, home pages, and other content. Reference numeral 106 denotes a Start Printing button which is used to make the printer 102 start printing what is displayed on the display 105. Reference numeral 107 denotes operation buttons which consist of a numeric keypad, function keys, etc. and allow the user who presses them to enter a telephone number or text as well as to browse home pages or content.

Reference numeral 108 denotes a USB interface port (host) which is used to communicate print data or the like and is connected with the USB interface port 103 of the printer 102 via a USB cable 109 during printing. FIG. 1 shows a state in which the USB interface ports 108 and 103 are connected. Reference numeral 110 denotes a center server (central base station) which can be accessed from the portable terminal 104 and has e-mail server functions, Internet service provider functions, etc. to administer various services and provide them to the owner of the portable terminal 104. Also, the center server 110 has various printer drivers for various portable terminals registered in a database (as described later) and is provided with capabilities to search for printer drivers, compare their versions, decide on a printer driver, and deliver it.

Figure 2:
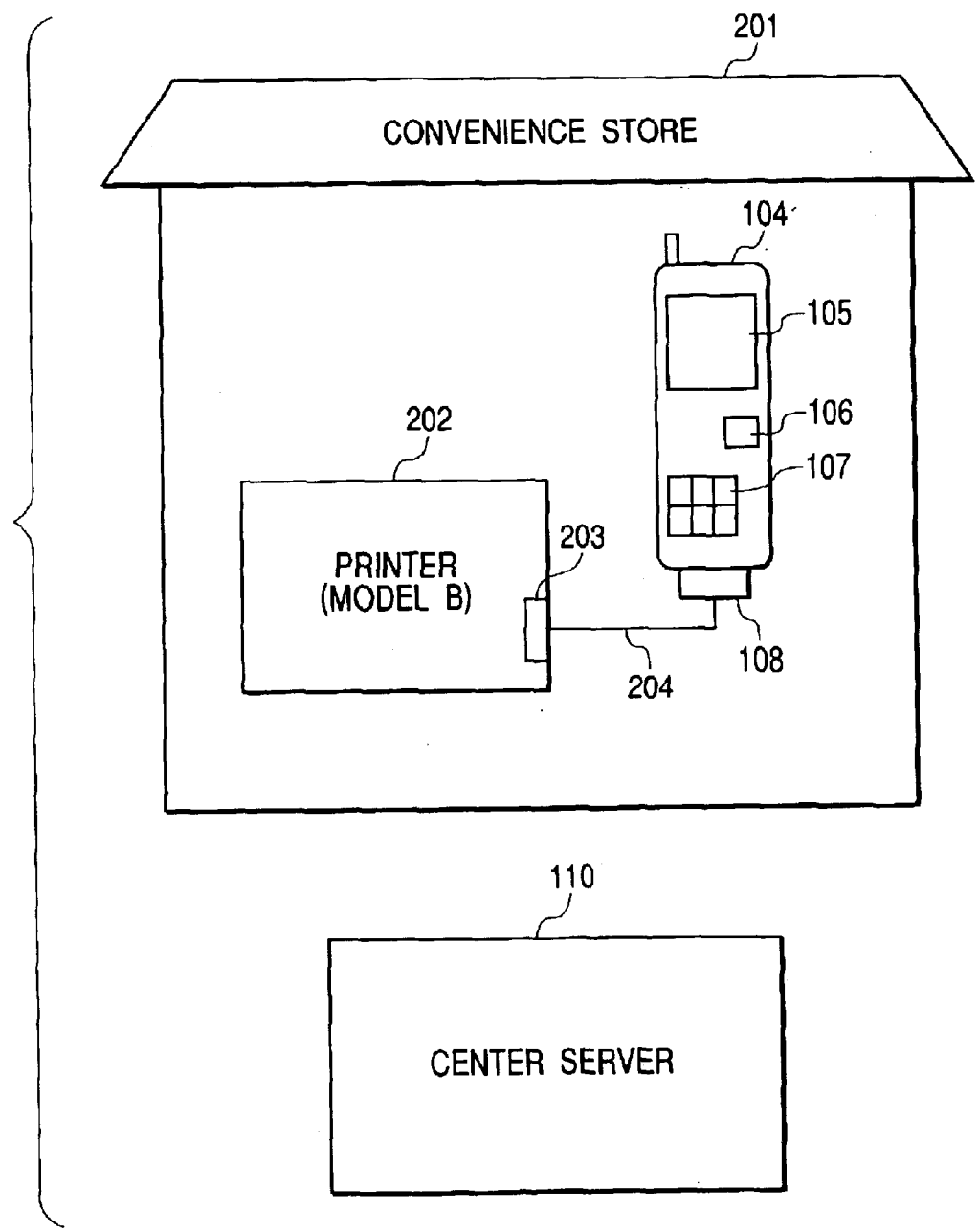
FIG. 2 is a diagram showing an example of how a printing system which is a recording system according to an embodiment of the present invention is implemented in a convenience store.

FIG. 2 is a diagram showing an example of how a printing system according to this embodiment is implemented in a convenience store. In FIG. 2, components equivalent to those in FIG. 1 are denoted by the same reference numerals as the corresponding components in FIG. 1. In FIG. 2, reference numeral 201 denotes a convenience store where a printer (Model B) 202, i.e., a recording device, has been installed. Reference numeral 203 denotes a USB interface port (slave) used to communicate print data or the like. FIG. 2 shows how the USB interface port 108 of the portable terminal 104 and USB interface port 203 of the printer 202 are connected via a USB cable 204.

Incidentally, the printer 102 in FIG. 1 and the printer 202 in FIG. 2 are entirely different models.

Figure 3:
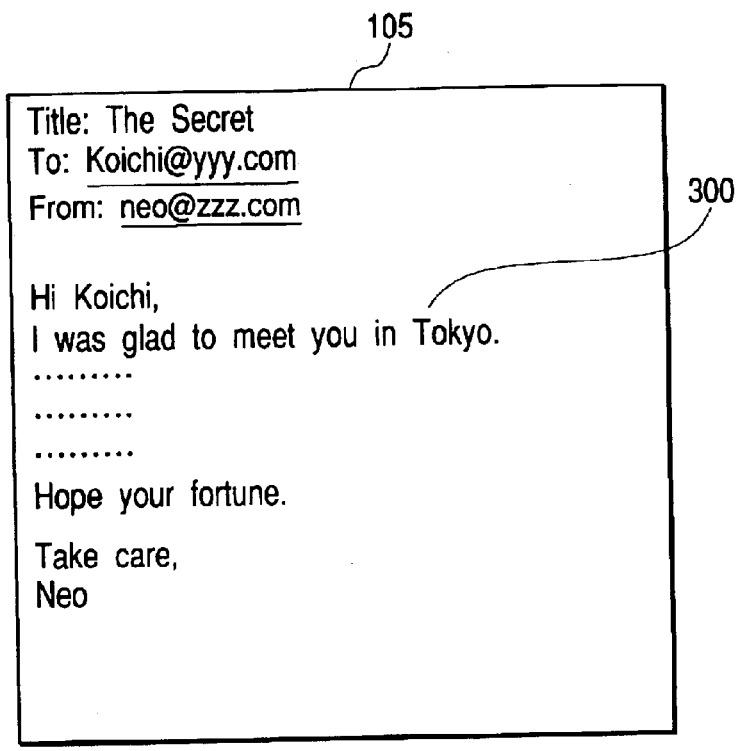
FIG. 3 is a diagram showing a piece of e-mail presented on a display in a printing system which is a recording system according to an embodiment of the present invention.

FIG. 3 is a diagram showing an example of e-mail received by accessing the center server 110 in the printing system according to this embodiment and displayed on the display 105. In the drawing, reference numeral 300 denotes a message contained in the e-mail received and stored.

Figure 4:
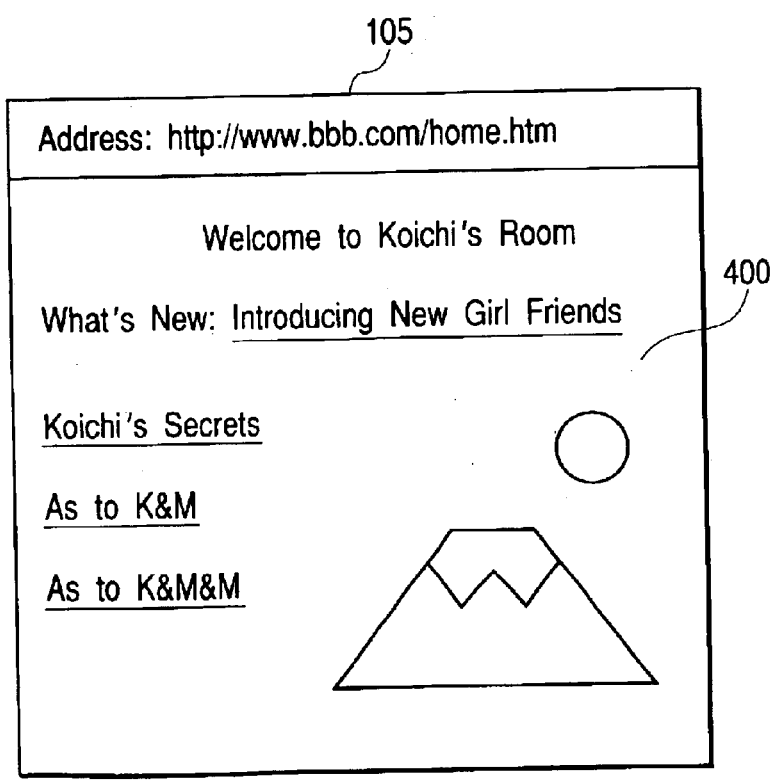
FIG. 4 is a diagram showing a home page presented on a display in a printing system which is a recording system according to an embodiment of the present invention.

FIG. 4 is a diagram showing an example of a home page opened by accessing the center server 110 in the printing system according to this embodiment and displayed on the display 105. In the drawing, reference numeral 400 denotes content of the home page opened and stored.

Figure 5:
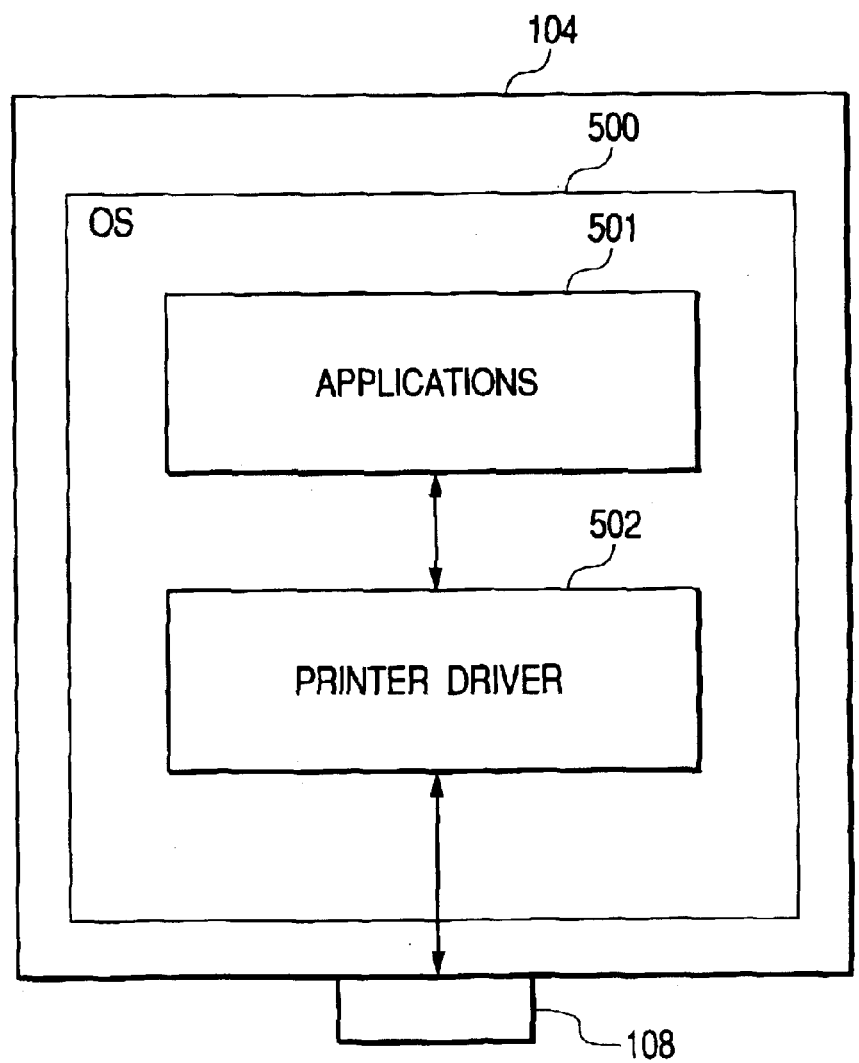
FIG. 5 is a block diagram of a software configuration and data flow on a portable terminal in a printing system which is a recording system according to an embodiment of the present invention.

FIG. 5 is a block diagram of a software configuration and data flow on the portable terminal 104 in the printing system according to this embodiment. In the drawing, reference numeral 500 denotes an operating system (OS) which controls all the functions of the portable terminal 104. Reference numeral 501 denotes applications such as a browser which is provided with a mailer for sending and receiving e-mail as well as capabilities to browse home pages or content. Reference numeral 502 denotes a printer driver which controls the printer 102 or the like. Via the OS 500, the printer driver 502 controls the connected printer 102 by sending and receiving data between application and printer.

At the time of looking at the portable terminal 104, the printer 102 and printer 202 are entirely different models with entirely different control commands for controlling the respective printers, and thus it is necessary to provide a printer driver for each printer.

Both hardware and software (including the OS 500) vary in configuration with the portable terminal 104. Looking at the printer 102, for example, a printer driver 502 which controls the printer 102 must be provided for each type (model) of portable terminal 104. When the most suitable printer driver 502 is incorporated into the portable terminal 104, it becomes possible to do printing.

Next, printing operations carried out by the printing system of this embodiment will be described with reference to FIG. 6.

Figure 6:
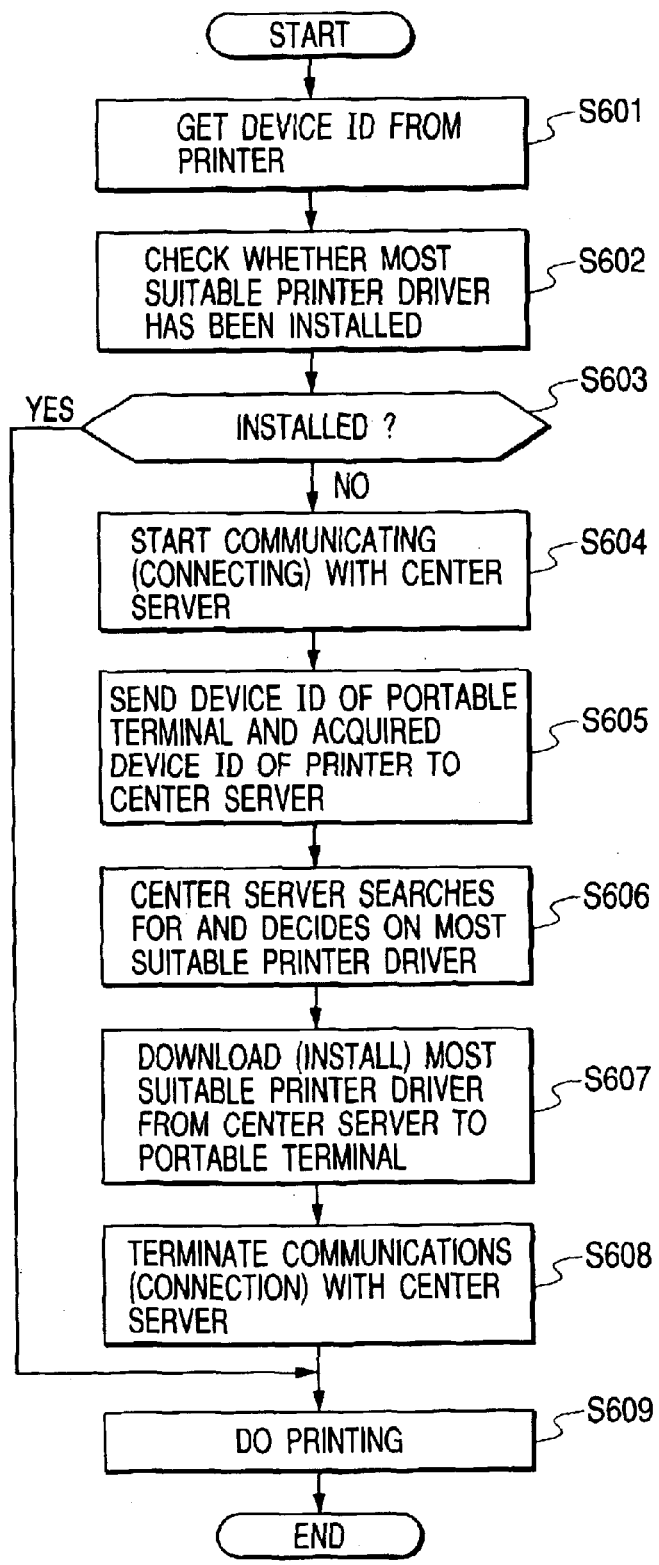
FIG. 6 is a flowchart showing a flow of printing operations carried out by a printing system which is a recording system according to an embodiment of the present invention.

FIG. 6 is a flowchart showing a flow of the printing operations carried out by the printing system of this embodiment.

Here, in FIG. 1, the e-mail shown in FIG. 3 is displayed on the display 105 of the portable terminal 104 which is neither accessing the center server 110 nor communicating by means of ordinary phone functions. Also, it is assumed that the printer driver 502 for the printer 102 has not been installed in the portable terminal 104 at present.

Now, if the Start Printing button 106 is pressed, the portable terminal 104 acquires a device ID (identifier) from the printer 102 using the USB printer class protocol (Step S601). Based on the device ID, the portable terminal 104 checks whether the most suitable printer driver 502 for the printer 102 has been installed in the portable terminal 104 (Step S602). Since no printer driver has been installed, the answer in Step S603 is NO, and the portable terminal 104 automatically accesses the center server 110 and starts communicating (connecting) with it (Step S604).

Next, the portable terminal 104 transmits its own device ID and the device ID of the printer 102 acquired in Step S601 above to the center server 110 (Step S605). Based on this information, the center server 110 searches for and decides on the most suitable printer driver 502 (Step S606).

The most suitable printer driver 502 decided on in Step S606 above is downloaded from the center server 110 and installed in the portable terminal 104 (Step S607). When the printer driver 502 has been installed, the portable terminal 104 terminates communications (connection) with the center server 110 (Step S608) and starts a printing process to carry out printing on the printer 102 (Step S609). Specifically, by using the printer driver just installed, the portable terminal 104 generates print data, transmits it to the printer, and has it printed. When the printer 102 finishes printing, this flow of processing operations is complete.

Here (with the printer driver 502 for the printer 102 installed, but no printer driver for the printer 202 installed in the portable terminal 104), the content of the home page shown in FIG. 4 is displayed on the display 105 of the portable terminal 104 which is neither accessing the center server 110 nor communicating by means of ordinary phone functions.

Now, if the Start Printing button 106 is pressed, the portable terminal 104 acquires a device ID from the printer 102 using the USB printer class protocol (Step S601). Based on the device ID, the portable terminal 104 checks whether the most suitable printer driver 502 for the printer 102 has been installed in the portable terminal 104 (Step S602). Since the printer driver has been installed, the answer in Step S603 is YES, and the portable terminal 104 goes to Step S609 where it starts a printing process to make the printer 102 carry out printing. When the printer 102 finishes printing, this flow of processing operations is complete.

Here (with the printer driver 502 for the printer 102 installed, but no printer driver for the printer 202 installed in the portable terminal 104), in FIG. 2, the content of the e-mail shown in FIG. 3 is displayed on the display 105 of the portable terminal 104 which is neither accessing the center server 110 nor communicating by means of ordinary phone functions.

Now, if the Start Printing button 106 is pressed, the portable terminal 104 acquires a device ID from the printer 202 using the USB printer class protocol (Step S601). Based on the device ID, the portable terminal 104 checks whether the most suitable printer driver 502 for the printer 202 has been installed in the portable terminal 104 (Step S602). Since no printer driver has been installed, the answer in Step S603 is NO, and the portable terminal 104 automatically accesses the center server 110 and starts communicating (connecting) with it (Step S604).

Then, the portable terminal 104 transmits its own device ID and the device ID of the printer 202 acquired in Step S601 above to the center server 110 (Step S605).

Based on this information, the center server 110 searches for and decides on the most suitable printer driver 502 (Step S606), downloads it from the center server 110 to the portable terminal 104, and installs it in the portable terminal 104 (Step S607). When the printer driver 502 has been installed, the portable terminal 104 terminates communications (connection) with the center server 110 (Step S608) and starts a printing process to carry out printing on the printer 102 (Step S609). When the printer 102 finishes printing, this flow of processing operations is complete.

As described above, the printing system according to this embodiment makes it easy to do printing on a connected printer even if no printer driver 502 has been installed in the portable terminal 104: the portable terminal 104 automatically acquires the device ID of the printer connected to it and transmits its own device ID and the acquired device ID of the printer to the center server 110, which then decides on the most suitable printer driver, downloads it to the portable terminal 104, and installs it in the portable terminal 104.

Incidentally, although device IDs are used as a means of identifying the printer 102, printer 202, and portable terminal 104, this is not restrictive, and any identification information may be used. Besides, there is no need for the identification information for the printers 102 and 202 and the identification information for the portable terminal 104 to be the same type. Different identification information may be used for different device categories: for example, it is possible to identify the printers 102 and 202 by device ID while identifying the portable terminal 104 by OS 500 information.

As described above, since this embodiment of the invention frees the user from the burdensome task of installing a dedicated driver for a recording device on a portable terminal as occasion arises, the user can make a recording on any recording device easily and reliably.

Also, if the dedicated driver for the recording device has already been installed in the portable terminal, since a recording operation can be started immediately without the need to install the driver in the portable terminal by connecting to a central control unit, the time required for recording can be reduced radically.

Besides, since appropriate control commands for controlling the recording device can be transmitted from the portable terminal to the recording device, recordings can always be made correctly.

Furthermore, visual information the user gets from display means can be recorded correctly on the recording device.

Second Embodiment of the Invention

Next, a second embodiment of the invention will be described. In addition to the functions of the first embodiment of the invention, the second embodiment of the invention is provided with an automatic update function. The printing system used here is the same as the one shown in FIGS. 1 to 5, and thus description thereof will be omitted.

Figure 7:
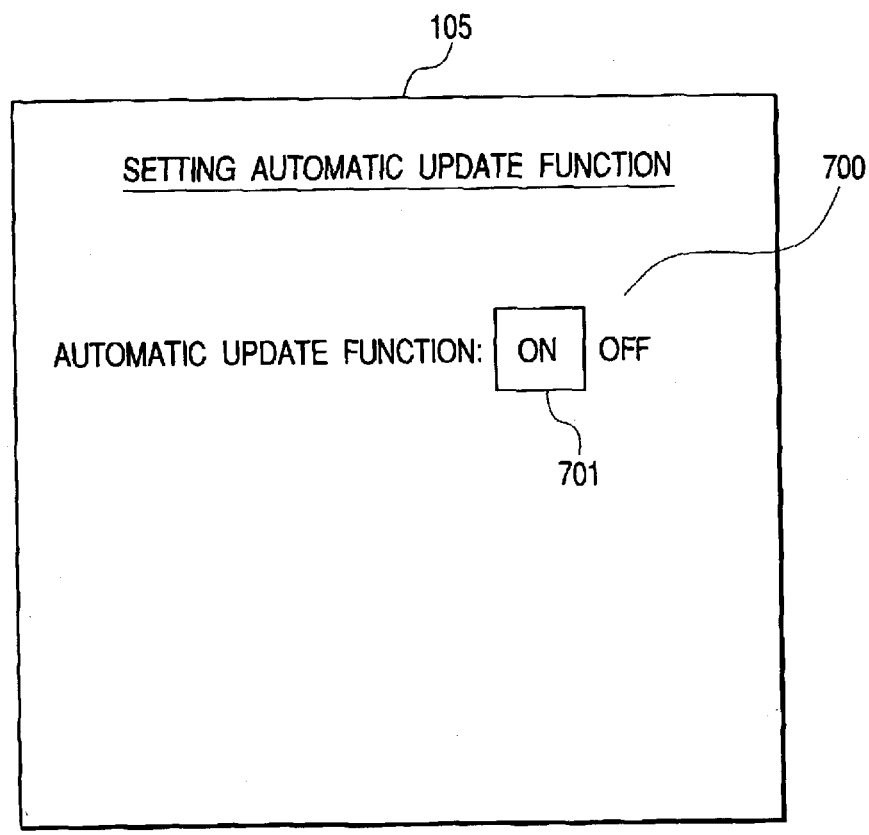
FIG. 7 is a diagram showing a settings screen of an automatic update function in a printing system which is a recording system according to an embodiment of the present invention.

FIG. 7 is a diagram showing a settings screen of the automatic update function available on a portable terminal 4 in the printing system according to this embodiment. In the drawing, reference numeral 700 denotes the settings screen of the automatic update function available on the display 105. The settings screen 700 allows the user to turn on and off the automatic update function for printer drivers. Reference numeral 701 denotes a selection cursor. Enclosing (selecting) ON or OFF on the settings screen 700 with the selection cursor 701 enables or disables the automatic update function for printer drivers. In FIG. 7, the automatic update function is set at ON.

Next, printing operations carried out by the printing system according to the second embodiment of the invention will be described with reference to FIG. 8.

Figure 8:
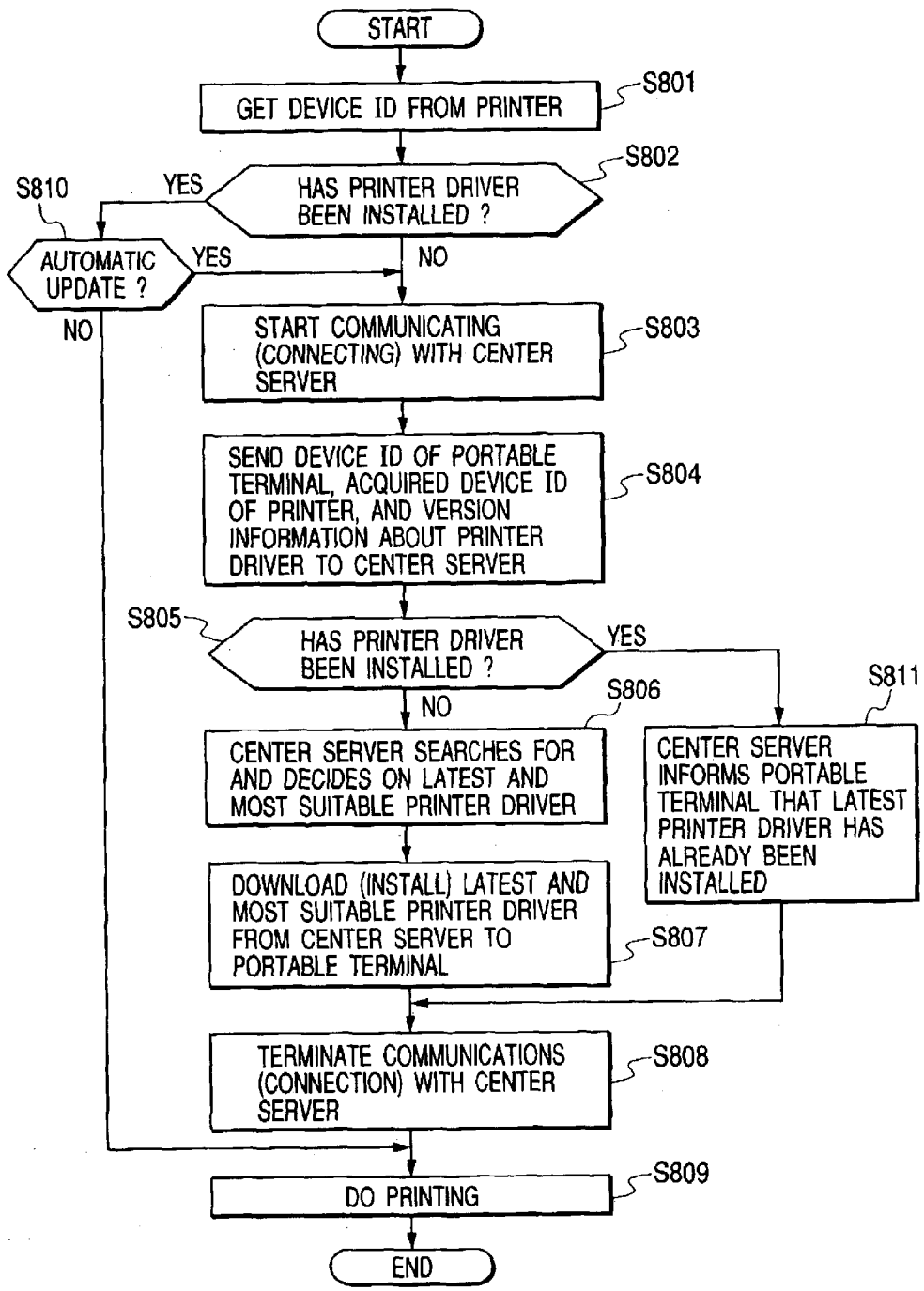
FIG. 8 is a flowchart showing a flow of printing operations carried out by a printing system which is a recording system according to an embodiment of the present invention.

FIG. 8 is a flowchart showing a flow of the printing operations carried out by the printing system of this embodiment.

Here, in FIG. 1, the e-mail shown in FIG. 3 is displayed on the display 105 of the portable terminal 104 which is neither accessing the center server 110 nor communicating by means of ordinary phone functions. The latest version of the printer's 102 printer driver 502 compatible with the portable terminal 104 is registered with the center server 110 as "Version 1". It is assumed at present that the printer driver 502 for the printer 102 has not been installed in the portable terminal 104 and that the automatic update function for the printer driver 502 is ON.

Now, if the Start Printing button 106 is pressed, the portable terminal 104 acquires a device ID (identifier) from the printer 102 using the USB printer class protocol (Step S801). Based on the device ID, the portable terminal 104 judges whether the most suitable printer driver 502 for the printer 102 has been installed in the portable terminal 104 (Step S802). It is judged here that no printer driver has been installed, and the portable terminal 104 automatically accesses the center server 110 and starts communicating (connecting) with it (Step S803).

Next, the portable terminal 104 sends the center server 110 its own device ID, the device ID of the printer 102 acquired in Step S801 above, and version information about the printer driver 502 installed in the portable terminal 104 (since no printer 502 driver has been installed at this time, the version information is "None") (Step S804). The center server 110 judges whether the version of the latest printer driver 502 registered with the center server 110—which is "Version 1" in this case—is newer than the version represented by the version information—which is "None" in this case (Step S805). If it is judged that the version of the printer driver 502 registered with the center server 110 is newer, the center server 110 searches for and decides on the latest and most suitable printer driver 502 based on the above information (Step S806).

The latest and most suitable printer driver 502 decided on in Step S806 above is downloaded from the center server 110 and installed in the portable terminal 104 (Step S807). When the printer driver 502 has been installed, the portable terminal 104 terminates communications (connection) with the center server 110 (Step S808) and starts a printing process to carry out printing on the printer 102 (Step S809). When the printer 102 finishes printing, this flow of processing operations is complete.

Here (with the printer driver 502—version 1—for the printer 102 installed), the contents of the home page shown in FIG. 4 are displayed on the display 105 of the portable terminal 104 which is neither accessing the center server 110 nor communicating by means of ordinary phone functions. Also, it is assumed that the automatic update function for the printer driver 502 is ON.

Now, if the Start Printing button 106 is pressed, the portable terminal 104 acquires a device ID from the printer 102 using the USB printer class protocol (Step S801). Based on the device ID, the portable terminal 104 judges whether the printer driver 502 for the printer 102 has been installed in the portable terminal 104 (Step S802). It is judged here that the printer driver has been installed, and the portable terminal 104 judges whether the automatic update function for the printer driver 502 is ON (Step S810). It is judged here that the automatic update function is ON, and the portable terminal 104 automatically accesses the center server 110 and starts communicating (connecting) with it (Step S803).

Then, the portable terminal 104 sends the center server 110 its own device ID, the device ID of the printer 102 acquired in Step S801 above, and version information "Version 1" of the printer driver 502 installed in the portable terminal 104 (Step S804). The center server 110 compares this version information "Version 1" with the version—which is "Version 1"—of the latest printer driver 502 registered with the center server 110. Since the printer driver 502 installed in the portable terminal 104 is the latest one (Step S805), the center server 110 transmits information that the latest printer driver 502 has been installed in the portable terminal 104 (Step S811). When the transmission is completed, the portable terminal 104 terminates communications (connection) with the center server 110 (Step S808) and starts a printing process to carry out printing on the printer 102 (Step S809). When the printer 102 finishes printing, this flow of processing operations is complete.

Needless to say, the amount of information (data volume) of the printer driver 502 is larger than the information amount (data volume) of the information that the latest printer driver has already been installed.

Here (with the printer driver 502—version 1—for the printer 102 installed), the content of the home page shown in FIG. 4 is displayed on the display 105 of the portable terminal 104 which is neither accessing the center server 110 nor communicating by means of ordinary phone functions. Also, it is assumed that the automatic update function for the printer driver 502 is OFF.

Now, if the Start Printing button 106 is pressed, the portable terminal 104 acquires a device ID from the printer 102 using the USB printer class protocol (Step S801). Based on the device ID, the portable terminal 104 checks whether the printer driver 502 for the printer 102 has been installed in the portable terminal 104 (Step S802). Here, since the printer driver has been installed and the automatic update function for the printer driver 502 is OFF (Step S810), the portable terminal 104 goes to Step S809 and starts a printing process to carry out printing on the printer 102. When the printer 102 finishes printing, this flow of processing operations is complete.

Here (with the printer driver 502—version 1—for the printer 102 installed), the content of the home page shown in FIG. 4 is displayed on the display 105 of the portable terminal 104 which is neither accessing the center server 110 nor communicating by means of ordinary phone functions. The latest version of the printer's 102 printer driver 502 compatible with the portable terminal 104 is registered with the center server 110 as "Version 2". Also, it is assumed that the automatic update function for the printer driver 502 is ON.

Now, if the Start Printing button 106 is pressed, the portable terminal 104 acquires a device ID from the printer 102 using the USB printer class protocol (Step S801). Based on the device ID, the portable terminal 104 checks whether the printer driver 502 for the printer 102 has been installed in the portable terminal 104 (Step S802). Here, since the printer driver has been installed and the automatic update function for the printer driver 502 is ON (Step S810), the portable terminal 104 automatically accesses the center server 110 and starts communicating (connecting) with it (Step S803). Then, the portable terminal 104 sends the center server 110 its own device ID, the device ID of the printer 102 acquired in Step S801 above, and version information "Version 1" of the printer driver 502 installed in the portable terminal 104 (Step S804).

The center server 110 compares this version information "Version 1" with the version—which is "Version 2"—of the latest printer driver 502 registered with the center server 110. Since the printer driver 502 registered with the center server 110 is newer (Step S805), the center server 110 searches for and decides on the latest and most suitable printer driver 502 based on the above information (Step S806), downloads it from the center server 110 to the portable terminal 104, and installs it in the portable terminal 104 (Step S807). When the printer driver 502 has been installed, the portable terminal 104 terminates communications (connection) with the center server 110 (Step S808) and starts a printing process to carry out printing on the printer 102 (Step S809). When the printer 102 finishes printing, this flow of processing operations is complete.

As described above, the printing system according to this embodiment makes it easy to do printing on a connected printer 102 even if no printer driver 502 has been installed in the portable terminal 104: the portable terminal 104 automatically acquires the device ID of the printer 102 connected to it and transmits its own device ID, the acquired device ID of the printer 102, and version information about the printer driver 502 installed in the portable terminal 104 to the center server 110, which then decides on the latest and most suitable printer driver 502, downloads it to the portable terminal 104, and installs it in the portable terminal 104.

Also, printing can be done easily on any printer 102 registered with the center server 110, everywhere and anywhere without discrimination.

Also, when the printer driver 502 has been installed in the portable terminal 104, if the automatic update function for the printer driver 502 is ON, the portable terminal 104 automatically acquires the device ID of the printer 102 connected to it and transmits its own device ID, the acquired device ID of the printer 102, and version information about the printer driver 502 installed in the portable terminal 104 to the center server 110. Then, the center server 110 decides on the latest and most suitable printer driver 502. If the printer driver 502 installed in the portable terminal 104 is not the latest one, the center server 110 downloads and installs the latest and most suitable printer driver 502 in the portable terminal 104, but if the latest printer driver 502 has already been installed in the portable terminal 104, the center server 110 informs the portable terminal 104 about it. This makes it possible to carry out printing easily anytime on a connected printer 102 according to the latest specifications.

Also, since the user is freed from the burdensome task of installing a dedicated printer driver 502 for a printer 102 in the portable terminal 104 as occasion arises, the user can carry out printing on any printer 102 easily and reliably.

Also, if the printer driver 502 provided on the center server 110 is updated, since the latest version of the printer driver 502 is installed automatically in the portable terminal 104, printing can be carried out by controlling the printer 102 always using the latest version of the printer driver 502 without the need for the burdensome task of updating the printer driver 502.

Also, if the dedicated printer driver 502 for the printer 102 has already been installed in the portable terminal 104, since a recording operation can be started immediately without the need to install the printer driver 502 in the portable terminal 104 by accessing the center server 110, the time required for recording can be reduced radically.

Also, since appropriate control commands for controlling the printer 102 can be transmitted from the portable terminal 104 to the printer 102, printing can always be carried out correctly.

Also, visual information the user gets from the display 105 can be printed correctly on the printer 102.

Also, if the printer driver 502 provided on the center server 110 is updated, since the latest version of the printer driver 502 is installed automatically in the portable terminal 104, printing can be carried out by controlling the printer 102 always using the latest version of the printer driver 502 without the need for the burdensome task of updating the printer driver 502.

Also, if the latest printer driver 502 for controlling the printer 102 from the portable terminal 104 has been installed in the portable terminal 104, there is no need to transmit the latest printer driver 502 from the center server 110 and install it in the portable terminal 104, and thus printing time can be reduced and communications costs can be slashed.

Also, if it is known that the latest printer driver 502 has already been installed in the portable terminal 104, for example, there is no need for the portable terminal 104 to transmit and receive various information by connecting to the center server 110, and thus printing time can be reduced and communications costs can be slashed.

Incidentally, although device IDs are used as a means of identifying the printer 102 and portable terminal 104, this is not restrictive, and any identification information may be used. Besides, there is no need for the identification information for the printer 102 and the identification information for the portable terminal 104 to be the same type. Different identification information may be used for different device categories: for example, it is possible to identify the printer 102 by device ID while identifying the portable terminal 104 by OS 500 information.

As described above, this embodiment of the invention allows content displayed on a terminal which can display content of e-mail or home pages to be recorded easily and reliably on any recording device installed at any place. Besides, even if control information of the recording device is updated, recordings can be made easily by using the latest control information.

Third Embodiment of the Invention

Next, a third embodiment of the invention will be described. In addition to the functions of the first embodiment of the invention, the third embodiment of the invention is provided with a capability to search and select a printer driver taking into consideration the hardware configuration, CPU type, OS, device type (device category) etc. of a terminal device as well as a capability to use XML for implementation. The printing system used here is the same as the one shown in FIGS. 1 to 5, and thus description thereof will be omitted.

Figures 9, 10:
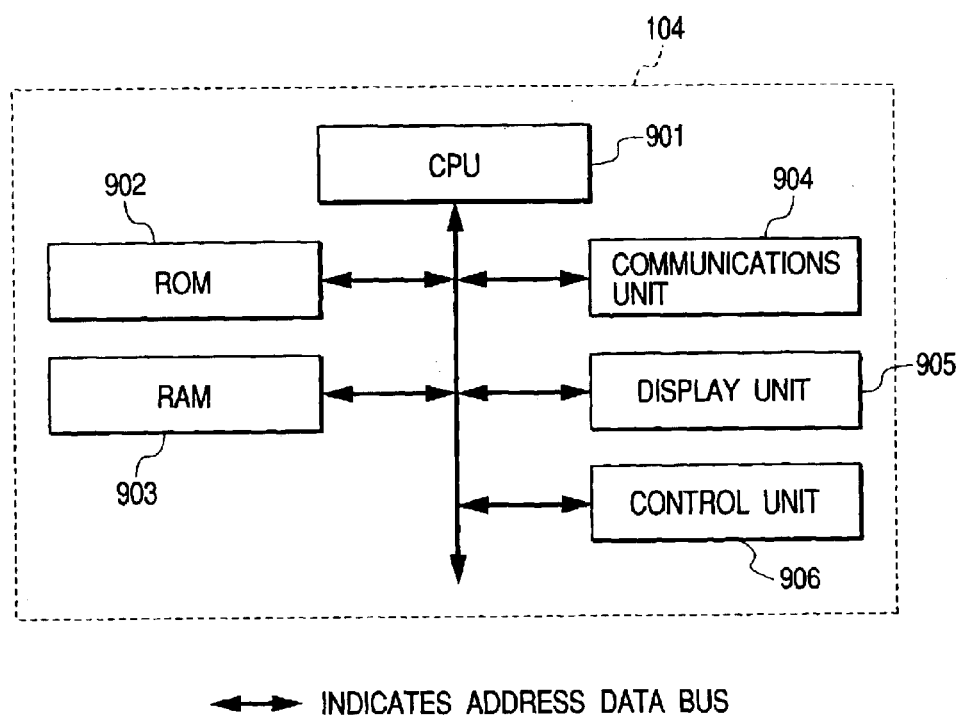
FIG. 9 is a block diagram showing an internal hardware configuration of a portable terminal 104.
FIG. 10 is a diagram showing an example of device ID data returned from a printer to the portable terminal 104.

FIG. 9 is a block diagram showing an internal hardware configuration of the portable terminal 104. In the drawing, reference numeral 901 denotes a CPU which is constituted by a microprocessor, etc.—for example, Intel's StrongARM SA1110 (hereinafter abbreviated to ARM). As the central processing unit of the portable terminal 104, the CPU 901 controls a RAM 903, communications unit 904, display unit 905, and control unit 906 according to programs stored in a ROM 902. As the OS for controlling the portable terminal 104 like the OS 500 shown in FIG. 5, the ROM 902 stores an OS which is based on Microsoft Windows CE 3.0 and customized to portable telephones. Besides, it stores various device drivers which control a display and ports and operate on the OS and the hardware consisting of the CPU 901 as well as stores applications or the like which can be started on the portable terminal 104. The RAM 903 usually has a capacity of around 64 MB, half of which is allocated as a program execution area and the rest of which is allocated as a data storage area. The printer driver 502 shown in FIG. 5 is stored in the data storage area of the RAM 903. The communications unit 904 includes the USB interface port 108 and controls USB communications. The display unit 905 includes the display 105 and controls displaying or the like of applications' user interfaces (may be abbreviated to UIs hereinafter), etc. The control unit 906 contains the Start Printing button 106 and operation buttons 107 and controls input from these buttons.

Incidentally, this hardware configuration can also be applied to the first and second embodiments described above.

FIG. 5 is a block diagram of a software configuration and data flow on the portable terminal 104 in the printing system according to this embodiment. In the drawing, reference numeral 500 denotes the operating system (OS) which controls all the functions of the portable terminal 104.

Reference numeral 501 denotes applications such as a browser which is provided with a mailer for sending and receiving e-mail as well as capabilities to browse home pages or content. Reference numeral 502 denotes the printer driver which controls the printer 102 or the like. Via the OS 500, the printer driver 502 controls the connected printer 102 by sending and receiving data between application and printer.

A dedicated module needs to be installed in the portable terminal 104 as the printer driver 502 depending on the combination of the OS on the portable terminal, type and hardware characteristics of the CPU, and model of the printer. The most suitable printer driver module for each of supported combinations is registered in a database in the center server 110.

FIG. 10 is a diagram showing an example of device ID data returned from a printer to the portable terminal 104. The figure shows device ID data returned from the printer 102 in response to a request from the portable terminal 104 when the portable terminal 104 is connected to the printer 102. Leading two bytes which indicate the length of the device ID are not shown in the drawing. As can be seen from the figure, the MANUFACTURER (MFG) of the printer 102 is Canon, COMMAND SET (CMD) is BJL, MODEL (MDL) is Model-A, CLASS(CLS) is PRINTER, DESCRIPTION (DES) is Canon Model-A, and VERSION (VER) is 4.00.

FIG. 11 is a diagram showing a data format of data transferred between portable terminal and printer. This data format can be used, for example, for the data transferred between the portable terminal 104 and printer 102 in Steps S804, S807, and S811 of FIG. 8. As can be seen from the figure, this data format is defined by text data written in extensible Markup Language (XML) standardized by W3C. The numbers at the far left of the figure are line numbers. In the drawing, on line 1 is an XML declaration which states that the description is written in compliance with XML version 1.0. On lines 2 through 24 is a root element, where the second line indicates that a name space of device schema Ver. 1.0 defined by Abe-Lab is applicable within the root element. On lines 3 through 23 is a device element. The device element contains host and peripheralDevice elements—there may be two or more host elements and peripheralDevice elements. On lines 4 through 12 is a host element, which contains a type element, manufacturer element, model element, cpu element, os element, version element, and deviceID element. On line 5 is the type element which describes the type of host function (function to control the peripheral device) of the portable terminal. On line 6 is the manufacturer element which describes the manufacturer name of the portable terminal. On line 7 is the model element which describes the model name of the portable terminal. On line 8 is the cpu element which describes the CPU type of the portable terminal. On line 9 is the os element which describes the OS name on the portable terminal. On line 10 is the version element which describes the version of firmware on the portable terminal. On line 11 is the deviceID element which describes the device ID of the portable terminal. On lines 13 through 22 is a peripheralDevice element which describes information about a controllable peripheral device connected to the portable terminal. The peripheralDevice element contains a type element, manufacturer element, model element, version element, driverVersion element, driver element, deviceID element, and availableHost element. On line 14 is the type element which describes the type of peripheral device. On line 15 is the manufacturer element which describes the manufacturer name of the peripheral device. On line 16 is the model element which describes the model name of the peripheral device. On line 17 is the version element which describes the version of firmware on the peripheral device. On line 18 is the driverVersion element which describes the version of the driver on the peripheral device. On line 19 is the driver element which describes the storage location of the driver module. The storage location is usually specified by a URL or URI. On line 20 is the device ID element which describes the device ID of the peripheral device. On line 21 is the availableHost element which describes the host type that can use the peripheral device described in the peripheralDevice element from among the host types described in the type element in the host element.

FIG. 12 is a diagram showing the data sent from the portable terminal 104 to the center server 110 in Step S804 of FIG. 8. The figure shows an example in which the portable terminal 104 is connected to the printer 102 and the version of the printer driver 502 installed in the portable terminal 104 is "Version 1". The numbers at the far left of the figure are line numbers. In the drawing, lines 1 and 2 are the same as lines 1 and 2 in FIG. 11, and thus description thereof will be omitted. On lines 2 through 28 is a root element, on lines 3 through 27 is a device element, and on lines 4 through 14 is a host element. On line 5 is a type element which states that the type of host function (function to control peripheral devices) of the portable terminal 104 is "phone". On line 6 is a manufacturer element which states that the manufacturer name of the portable terminal 104 is Abe-Lab. On line 7 is a model element which states that the model name of the portable terminal 104 is SP 104. On line 8 is a cpu element which states that the CPU type of the portable terminal 104 is ARM. On line 9 is an os element which states that the OS on the portable terminal 104 is Windows CE 3.0. On line 10 is a version element which states that the version of firmware on the portable terminal 104 is 5.00. On lines 11 through 13 is a device Id element. Line 12 describes the device ID of the portable terminal 104. On lines 15 through 26 is a peripheralDevice element. On line 16 is a type element which states that the type of the printer 102, a controllable peripheral device connected to the portable terminal 104, is "printer". On line 17 is a manufacturer element which states that the manufacturer name of the printer 102 is Canon. On line 18 is a model element which states that the model name of the printer is Model-A. On line 19 is a version element which states that the version of firmware on the printer 102 is 4.00. On line 20 is a driverVersion element which states that the version of the driver on the printer 502 is 1.00, i.e., the version information is "Version 1". On line 21 is a driver element which remains empty at the time of transmission from the portable terminal 104 to the center server 110. On lines 22 through 24 is a deviceID element. Line 23 describes the device ID of the printer 102. On line 25 is an availableHost element which states that the host type that can use the printer 102, the peripheral device described in the printer element, is the "phone" type described in the type element in the host element. In this example, the "phone" type represents a main function of the portable terminal 104. When the portable terminal 104 actually creates such data as the one shown in this figure and transmits it to the center server 110, data in XML format is created on the portable terminal 104 and transmitted to the center server 110, based on the device ID (such as the one shown in FIG. 10) acquired from the printer 102, the device ID of the portable terminal 104 itself, and other data.

FIGS. 13 to 17 are diagrams showing a database of printer drivers registered with the center server 110. As can be seen from the figure, the database is constructed from data in XML format. The numbers at the far left of the figure are line numbers. In the drawing, on line 1 is an XML declaration which states that the description is written in compliance with XML version 1.0. On lines 2 through 107 is a root element, where the second line indicates that a name space of device schema Ver. 1.0 defined by Abe-Lab is applicable within the root element. On lines 3 through 106 is a server element, which contains a driver element described on lines 4 through 105. The driver element contains a plurality of peripheralDevice elements. On lines 5 through 64 is a first peripheralDevice element which represents the printer 102 and describes driver information of the printer 102. The peripheralDevice element contains a type element, manufacturer element, model element, and os element. On line 6 is the type element which states that the type of the first peripheral device registered is "printer". On line 7 is the manufacturer element which states that the manufacturer name of this peripheral device is Canon. On line 8 is the model element which states that the model name of the peripheral device is Model-A. On lines 9 through 63 is the os element which consists of one name element and more than one host element. On line 10 is the name element which states that the OS is Windows CE 3.0, and thus it can be seen that the os element is intended for Windows CE 3.0. On lines 11 through 28 is the first host element, which consists of one type element and more than one cpu element. This host element represents the portable terminal 104. On line 12 is the type element which states that the type of host is "phone". On lines 13 through 17 is the first cpu element, which consists of a type element, driverVersion element, and driver element. On line 14 is the type element which states that the CPU type is "ARM". On line 15 is the driverVersion element which states that the version of the printer driver is 2.00, i.e., the version information is "Version 2". On line 16 is the driver element which states that the driver module most suitable to this OS, CPU type, and host type of the peripheral device is v200drv__ARM.exe stored on the server specified by the URL. Since the CPU type of the portable terminal 104 is "ARM", this driver is the latest printer driver for the printer 102 most suitable to the portable terminal 104. On lines 18 through 22 is the second cpu element and on lines 23 through 27 is the third cpu element. These elements are described for the CPU types of MIPS and SH-4, respectively. The format used here is the same as the one described above, and thus description thereof will be omitted. On lines 29 through 41 is the second host element, which represents Pocket PC, a PDA based on the Microsoft Windows CE 3.0 OS. Although this host element differs from the first host element in that the host type described in the type element on line 30 is Pocket PC, that the driver version described in the driverVersion element on lines 33 and 38 is 2.50, and that the driver module described on lines 34 and 39 is different from that of the first host element, it can be seen that individual components are similar to those of the first host element. Also, it can be seen that although a driver for the SH-4 CPU type is provided for the phone type host as described on lines 23 through 27, no driver for the SH-4 CPU type is provided for the Pocket PC type host. In this way, not all hardware may be provided with a driver of the same specification at manufacturer's convenience, but such a situation can be dealt with easily and quickly by building a database in XML format. On lines 43 through 63 is the second Os element. Since line 44 contains "Windows NT 4.0", it can be seen that this Os element is intended for Windows NT 4.0. On lines 45 through 62 is a host element. Since the type element on line 46 contains "pc", it can be seen that the host type is "personal computer". Lines 47 through 51, 52 through 56, and 57 through 61 contain driver information for CPU types of X86, Alpha, and PC-9800, respectively. Thus, it can be seen that separate printer driver modules for the three CPU types are available as printer drivers for the printer 102 for use with personal computers running the Windows NT 4.0 OS. On lines 65 through 104 is the second peripheralDevice element, which represents the printer 202 shown in FIG. 2. This element is similar in configuration to the first peripheralDevice element which represents the printer 102, but differs in the number and version of supported drivers. For example, when the cpu element described on lines 73 through 77 and the cpu element described on lines 78 through 82 are compared in the driver information for Windows CE 3.0 described in the os element on lines 69 through 92, the version of the driver for the ARM CPU type (the former) is 2.00 as described on line 75 whereas the version of the driver for the MIPS CPU type (the latter) is 1.00 as described on line 80. In this way, the driver version may vary even for the same host type ("phone" type in this case) and the same OS at manufacturer's convenience, but such a situation can be dealt with easily and quickly by building a database in XML format. The os element on lines 93 through 103 represents the Windows NT 4.0 OS, but detailed description thereof will be omitted because this element is similar in configuration to that for the printer 102 described in the first peripheralDevice element except for differences in the driver version described on line 99, driver module described on line 100, and supported CPU types described on lines 97 through 101.

Figure 18:
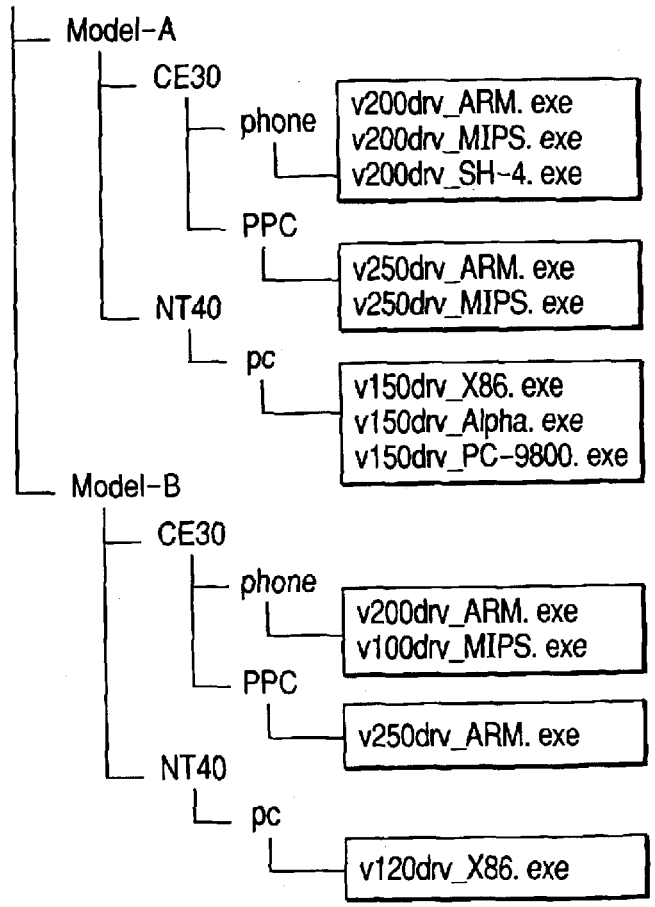
FIG. 18 is a diagram showing how drivers are stored.

FIG. 18 is a diagram showing how drivers are stored. In the drawing, <Web Server Root> is the Web server root directory under which the drivers are stored. In this example, it corresponds to http://Abe-Lab.jp shown in FIG. 13. Since this Web server resides on the center server 110, the drivers are stored in the center server 110. As shown in FIG. 18, the root directory has subdirectories organized in a tree structure. In this tree structure, the drivers are classified as separate modules according to printer (peripheral device) models, OSes on portable terminals, types of portable terminals, and CPUs. Incidentally, the CE30 directories correspond to the Windows CE 3.0 OS, NT40 directories correspond to the Windows NT 4.0 OS, and PPC directories correspond to host type Pocket PC. The other directory names represent the same things as those represented by the same character strings which constitute elements or data in FIG. 13. For example, the latest printer driver for the printer 102 most suitable to the portable terminal 104 is found at the URL indicated on line 16 in FIG. 13:

<Web Server Root>¥download¥Canon¥Model-A¥CE30¥phone¥v200drv__ARM.exe.

v200drv__ARM.exe is an executable installer of the printer driver. When the portable terminal 104 accesses the center server 110 and starts up this installer, the printer driver is downloaded from the center server 110 and installed in the portable terminal 104.

Figure 19:
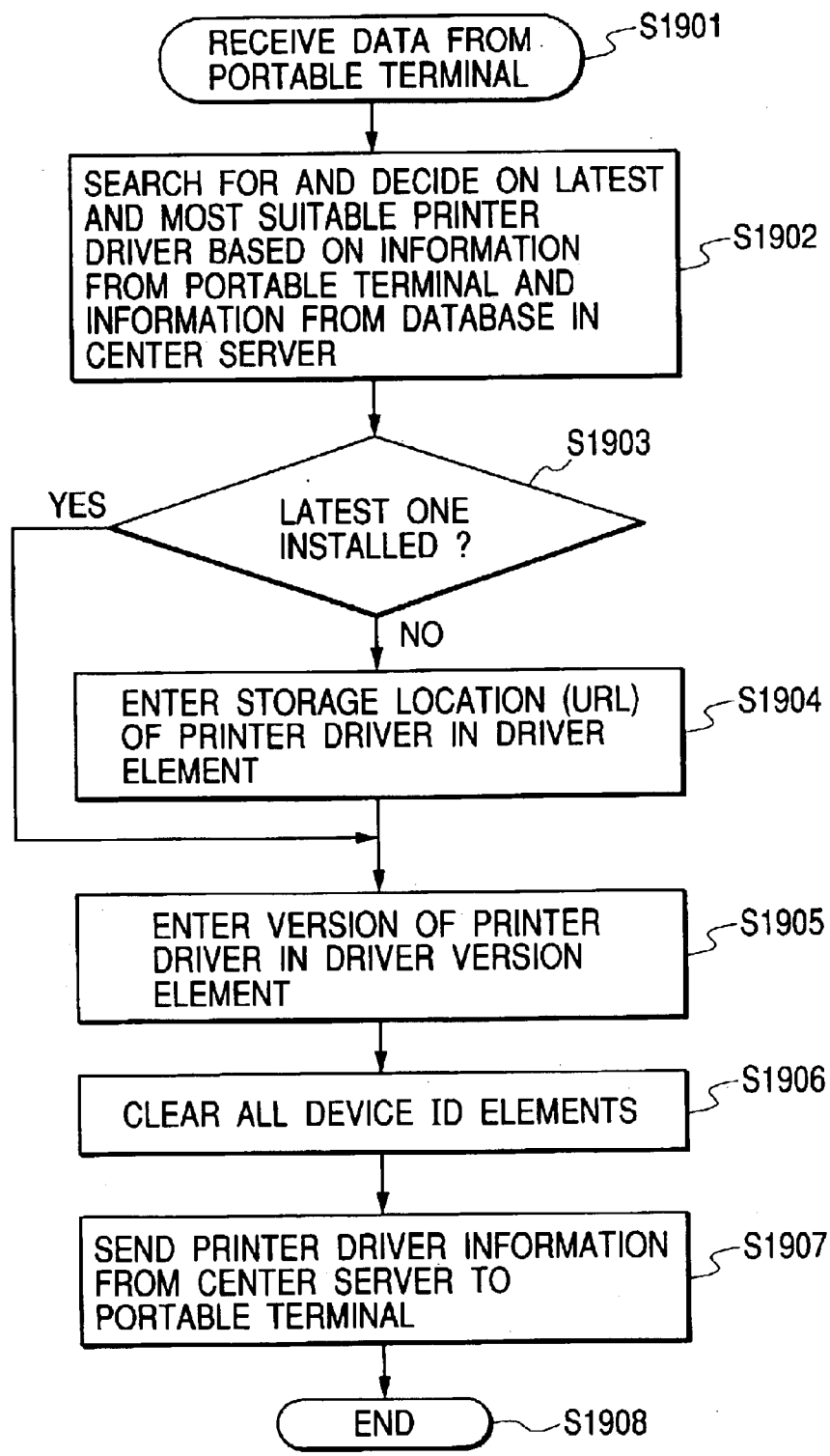
FIG. 19 is a flowchart showing processes carried out by the center server 110 upon receiving data from the portable terminal 104.

FIG. 19 is a flowchart showing processes carried out by the center server 110 upon receiving data from the portable terminal 104. These processes correspond to the processes carried out in Steps S804, S805, S806, and S811 of FIG. 8. In FIG. 19, upon receiving data in the data format shown in FIG. 12 from the portable terminal 104 (S1901), the center server 110 searches the database (FIG. 13) of the center server 110 recursively by comparing the data of each element between the received data and information stored in the database, and thereby decides on the latest and most suitable printer driver (S1902). Since the database is constructed in XML format as described with reference to FIG. 13, recursive searches can be carried out, which makes it possible to search for and decide on the latest and most suitable printer driver reliably by using simple logic. After editing the data received from the portable terminal 104 in the data format shown in FIG. 12, the center server 110 returns it to the portable terminal 104. The processes involved here will be described with reference to Steps S1903 to S1908. The driverVersion element on line 20 in FIG. 12 and the driverVersion element on line 15 in FIG. 13 are compared, and if the latest printer driver has not been installed in the portable terminal 104 as shown in the examples of FIGS. 12 and 13 (S1903), the storage location (URL) of a printer driver described on line 16 in FIG. 12 is entered in the driver element left empty on line 21 in FIG. 12 (S1904). Then, the center server 110 enters the version described by the driverVersion element on line 15 in FIG. 13 in the driverVersion element on line 20 in FIG. 12 (S1905), clears and empties all the deviceID elements on lines 12 and 23 in FIG. 12 (S1906), transmits the edited XML-format data to the portable terminal 104 (S1907), and finishes processing (S1908). The reason why all the deviceID elements are cleared in Step S1906 is that it is desirable in logic terms to do so in view of the fact that the device ID is unknown at the time when data is returned from the center server 110 which is independent of devices such as the portable terminal 104 and printer 102 because the device ID data usually changes depending on the conditions of the device. If the latest printer driver has already been installed in the portable terminal 104 in Step S1903, the center server 110 goes to Step S1905. Since the driver element on line 21 in FIG. 12 remains empty if the latest printer driver has already been installed in the portable terminal 104, when receiving data from the center server 110, the portable terminal 104 can check easily whether the latest printer driver has already been installed in the portable terminal 104.

FIG. 20 is a diagram showing data transmitted from the center server 110 to the portable terminal 104. As described with reference to FIG. 19, after receiving data such as the one shown in FIG. 12 from the portable terminal 104, the center server 110 edits it before returning it to the portable terminal 104. In FIG. 12, lines 11, 18, 19, and 20 contain the data edited by the center server 110. In this example, line 19 contains the storage location (URL) of a printer driver, which means that the latest printer driver has not been installed in the portable terminal 104. For example, if the latest printer driver has already been installed in the portable terminal 104, the driver element on line 19 remains empty.

Figure 21:
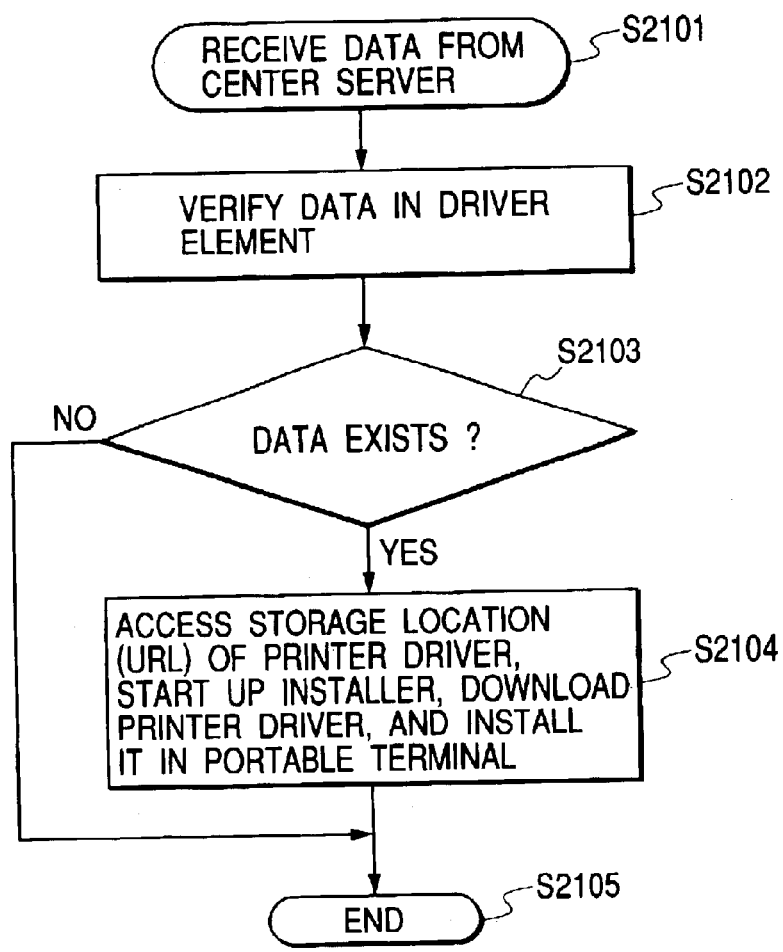
FIG. 21 is a flowchart showing processes carried out by the portable terminal 104 upon receiving data from the center server 110.

FIG. 21 is a flowchart showing processes carried out by the portable terminal 104 upon receiving data from the center server 110. These processes correspond to the processes carried out in Step 807 of FIG. 8. In FIG. 21, upon receiving data from the center server 110 (S2101), the portable terminal 104 checks the driver element data such as the one contained in line 19 in FIG. 20 (S2102). If the driver element contains the storage location (URL) of a printer driver (S2103), this means that the latest printer driver has not been installed in the portable terminal 104. Therefore, the portable terminal 104 accesses the storage location (URL) of the printer driver, starts up the installer of the printer driver, downloads the printer driver from the center server 110, installs it in the portable terminal 104 (S2104), and finishes processing (S2105). If the driver element is empty in Step S2103, this means that the latest printer driver has already been installed in the portable terminal 104, and the processing is finished (S2105).

As described above, the use of XML data format makes it easy to transmit and receive data on the Internet as well as makes it easy for applications such as a Web browser on the portable terminal 104 and the Web server on the center server 110 to handle data. This allows ease of implementation on the portable terminal 104 and ease of system construction including the center server 110.

In this embodiment, a portable telephone equipped with wireless communications capabilities has been cited as an example of the portable terminal 104, but the present invention is not limited to this, and applies to any portable terminal equipped with wireless communications capabilities.

Also, in this embodiment, a color printer has been cited as an example of a peripheral device, but the present invention is not limited to this, and applies to any peripheral device, including digital cameras, which needs a device driver dedicated to it.

Also, in this embodiment, a mailer and browser have been cited as examples of applications, but the present invention is not limited to this, and applies to any application which suits the purposes of the present invention.

Also, in this embodiment, a USB interface has been cited as an example of the interface between the portable terminal 104 and printer 102 or 202, but the present invention is not limited to this USB interface, and applies to any interface with a similar configuration.

Needless to say, the objects of the present invention can also be achieved by a storage medium containing the software program code that implements the functions of the above embodiments: it is supplied to a system or apparatus, whose computer (or CPU or MPU) then reads the program code out of the storage medium and executes it.

In that case, the program code itself read out from the storage medium will implement the functions of the above embodiments, and the storage medium which stores the program code will constitute the present invention.

The storage medium for supplying the program code may be, for example, a floppy (registered trademark) disk, hard disk, magneto-optical disk, CD-ROM, CD-R, CD-RW, DVD-ROM, DVD-RAM, DVD-RW, DVD+RW, magnetic tape, non-volatile memory card, ROM, or the like.

Also, the functions of the above embodiments may be implemented not only by the program code read out and executed by the computer, but also by part or all of the actual processing executed, in accordance with instructions from the program code, by an OS (operating system), etc. running on the computer.

Furthermore, it goes without saying that the functions of the above embodiments may also be implemented by part or all of the actual processing executed by a CPU or the like contained in a function expansion board inserted in the computer or a function expansion unit connected to the computer if the processing is performed in accordance with instructions from the program code that has been read out of the storage medium and written into memory on the function expansion board or unit.

As described above, the embodiments of the present invention allow an appropriate printer driver to be downloaded taking into consideration identification information for a printer.

Also, they allow an appropriate printer driver to be downloaded by recognizing the hardware configuration of a terminal device.

What is claimed is:

1. An information processing apparatus comprising:

an input unit, adapted for inputting hardware information on hardware of a terminal device, operating system information on an operating system of the terminal device, and model information on a model of a peripheral device;

a determination unit, adapted for determining a control program for controlling the peripheral device based on the hardware information, the operating system information and the model information input by said input unit; and a transmission unit, adapted for transmitting the control program determined by said determination unit to the terminal device.

2. The information processing apparatus according to claim 1, wherein said hardware information includes hardware configuration information.

3. The information processing apparatus according to claim 1, wherein said hardware information includes information which indicates types of hardware.

4. The information processing apparatus according to claim 1, wherein said peripheral device includes a printer.

5. The information processing apparatus according to claim 1, wherein said input unit is further adapted for inputting operating system information for the terminal device.

6. The information processing apparatus according to claim 1, wherein said hardware information is in XML format.

7. An information processing method comprising:

an input step of inputting hardware information on hardware of a terminal device, operating system information on an operating system of the terminal device, and model information on a model of a peripheral device;

a determination step of determining a control program for controlling the peripheral device based on the hardware information, the operating system information and the model information input by said input step; and a transmission step of transmitting the control program determined in said determination step to the terminal device.

8. The information processing method according to claim 7, wherein said hardware information includes hardware configuration information.

9. The information processing method according to claim 7, wherein said hardware information includes information which indicates types of hardware.

10. The information processing method according to claim 7, wherein said peripheral device includes a printer.

11. The information processing method according to claim 7, wherein said inputting step further comprises a step of inputting operating system information for the terminal device.

12. The information processing method according to claim 7, wherein said hardware information is in XML format.

13. A program comprising:

an input step of inputting hardware information on hardware of a terminal device, operating system information on an operating system of the terminal device, and model information on a model of a peripheral device;

a determination step of determining a control program for controlling the peripheral device based on the hardware information, the operating system information and the model information input by said input step; and a transmission step of transmitting the control program determined in said determination step to the terminal device.

14. The program according to claim 13, wherein said hardware information includes hardware configuration information.

15. The program according to claim 13, wherein said hardware information includes information which indicates types of hardware.

16. The program according to claim 13, wherein said peripheral device includes a printer.

17. The program according to claim 13, wherein said inputting step further comprises a step of inputting operating system information for the terminal device.

18. The program according to claim 13, wherein said hardware information is in XML format.

19. A storage medium for storing a program, said program comprising:

an input step of inputting hardware information on hardware of a terminal device, operating system information on an operating system of the terminal device, and model information on a model of a peripheral device;

a determination step of determining a control program for controlling the peripheral device based on the hardware information, the operating system information and the model information input by said input step; and a transmission step of transmitting the control program determined in said determination step to the terminal device.

20. An information processing system comprising:

a terminal device, adapted for acquiring model information on a model of a recording device before recording;

a server, adapted for determining a control program for controlling the recording device based on hardware information on hardware of said terminal device, operating system information on an operating system of said terminal device, and the model information transmitted from said terminal device and transmitting the determined control program to said terminal device; and said recording device, adapted for receiving and recording information generated based on the control program transmitted from said server to said terminal device.

* * * * *